United States Patent [19]
Shinagawa et al.

[11] Patent Number: 5,897,629
[45] Date of Patent: Apr. 27, 1999

[54] APPARATUS FOR SOLVING OPTIMIZATION PROBLEMS AND DELIVERY PLANNING SYSTEM

[75] Inventors: Akio Shinagawa; Hiroyuki Okada, both of Kawasaki; Ayumi Nakabayashi; Kazumi Takada, both of Tokyo, all of Japan

[73] Assignee: Fujitsu Limited, Kawasaki, Japan

[21] Appl. No.: 08/775,333

[22] Filed: Dec. 31, 1996

[30] Foreign Application Priority Data

May 29, 1996 [JP] Japan .................................. 8-134701

[51] Int. Cl.⁶ ...................................................... G06F 15/18
[52] U.S. Cl. ................................................................. 706/13
[58] Field of Search ................................ 395/13; 706/13

[56] References Cited

U.S. PATENT DOCUMENTS

| | | | |
|---|---|---|---|
| 5,136,686 | 8/1992 | Koza | 395/13 |
| 5,222,191 | 6/1993 | Shaefer | 395/13 |
| 5,319,781 | 6/1994 | Syswerda | 395/650 |
| 5,343,554 | 8/1994 | Koza et al. | 395/13 |
| 5,541,848 | 7/1996 | McCormack et al. | 395/13 |
| 5,581,657 | 12/1996 | Lyon | 395/13 |

FOREIGN PATENT DOCUMENTS

| | | |
|---|---|---|
| 7-219920 | 8/1995 | Japan . |
| 7-230443 | 8/1995 | Japan . |

OTHER PUBLICATIONS

Uckun et al, "Managing Genetic Search in Job Shop Scheduling", IEEE Expert Magazine, Oct. 1993, vol. 8, issue 5.
Ono et al, "A Genetic Algorithm for Job–Shop Scheduling Problems Using Job–based Order Crossover", IEEE Evolutionary Computation Conference, 1996.
Falkenauer et al, "A Genetic Algorithm for Job Shop", IEEE International Conference on Robotics and Automation, 1991.
Uchimura et al, "Genetic Algorithm for Vehicle Routing Problem in Delivery System", IEEE Vehicle Navigation and Information Systems, 1994.

*Primary Examiner*—Tariq R. Hafiz
*Attorney, Agent, or Firm*—Staas & Halsey

[57] ABSTRACT

A problem solver apparatus for solving optimization problems, which finds better solutions at a higher speed by utilizing both genetic algorithms and OR-based techniques. When an optimization problem is given to the problem solver apparatus, a searching strategy optimization unit creates a population of individuals using a genetic algorithm. Each individual has a chromosome to indicate a solution searching strategy. Upon receipt of such a population, a solution searching unit searches for solutions according to the strategies respectively indicated by the chromosomes of the individuals, thus obtaining candidate solutions. This group of candidate solutions is returned to the searching strategy optimization unit. The searching strategy optimization unit calculates fitness values of respective candidate solutions in the received candidate group. The searching strategy optimization unit applies some genetic operators to the individuals, thereby producing a new generation population. The produced new generation population is directed to the solution searching unit to perform another search. The problem solver apparatus repeats the above procedure until the candidate solutions show some acceptable fitness values. Lastly, the fittest candidate solution is chosen as the final solution of the optimization problem.

26 Claims, 16 Drawing Sheets

APPARATUS FOR SOLVING OPTIMIZATION PROBLEMS AND DELIVERY PLANNING SYSTEM

BACKGROUND OF THE INVENTION

1. Field of the Invention

The present invention relates to problem solver apparatus for solving optimization problems, and delivery planning systems for solving delivery planning problems. More specifically, the present invention is related to a problem solver apparatus for solving optimization problems by searching for an optimal solution with genetic algorithms (GA) and a delivery planning system for finding an optimal delivery schedule by using genetic algorithms.

2. Description of the Related Art

Mathematical programming, or optimization theory, is generally defined as problems of finding an optimal solution that minimizes or maximizes the value of a certain objective function (evaluation function) of a plurality of variables under several given constraints. Mathematical programming is applied to a variety of engineering fields from jet engines to communications networks. Due to the application-specific nature of optimization problems, various searching methods have been proposed for finding optimal solutions.

Several practical techniques known as Operations Research (OR) have been widely used to solve the optimization problems. For example, there is a special case where the objective function is entirely linear. This type of problems are called "linear programming," which has been studied from long ago. Some classical techniques in this area include so-called hill-climbing methods, in which a feasible solution (i.e., values of the variables that satisfy all constraints) is gradually varied in such a way that the value of the objective function will increase (or decrease, depending on each problem). In other words, this algorithm moves from point to point within a constrained solution space, simply trying to climb uphill so as to converge into the optimal solution, although some of the hill-climbing methods does not always require the interim solutions to be kept within a set of feasible solutions in the process of convergence. The optimal solution mentioned just above may be actually a near-optimal solution, or acceptable solution, which may involve some amount of, but allowable in a practical sense, error from the true optimal solution.

In reality, however, there are some problems that cannot be solved by such simple techniques as the hill-climbing methods. That is, even if a new feasible solution obtained by slightly changing all or part of the variables seems to be the best in the neighborhood of the current position in the solution space, it could only be a local optimization, but a better solution may be found in a separate place by conducting a substantial change of the variables. This type of problem, which exhibits some "local optima" but has a true optimal solution at somewhere else, cannot be solved by ordinary hill-climbing methods.

To overcome the above-described deficiency, researchers introduced new search techniques called genetic algorithms (GA). Genetic algorithms mimic the processes observed in biological inheritance, to utilize their performance in some engineering fields.

In the processes of biological evolution, a newly born individuals (offspring) often acquire some new traits different from those the existing individuals (parents) have, due to genetic recombination operations including crossover of chromosomes of the individuals and mutation of genes contained in the chromosomes. Through successive selection processes, inferior individuals that cannot adapt themselves to the biological environment are likely to be weeded out, and fit individuals tend to be able to survive and continue to leave their offspring.

Genetic algorithms apply the above-described biological evolution process to optimization problems in an analogical way, where each individual represents a candidate for the optimal solution and the genes arranged on the chromosome of an individual correspond to the values of the variables constituting a solution. The objective function in an optimization problem represents the biological environment, and the value of this objective function indicates the fitness of each individual to the environment. In this sense, the objective function is called "fitness function" in the genetic algorithm terminology, which gives increased values to more optimal solutions. The degree of fitness to the environment is evaluated through calculation of the fitness value, namely, the value of the fitness function for each individual. In the selection process, as will be described later, candidate solutions having smaller fitness values will get higher probabilities in being deleted from the population.

Based on the above-described definitions, a population of individuals (i.e., candidate solutions) are subjected to the cyclic processes of selection/reproduction, crossover, and mutation. A solution searching process according to this genetic algorithm will be briefly outlined below.

First, a population of individuals are created, which initial population is called the first generation. Then the selection is made on the first generation. In this selection process, the fitness value of each individual is calculated from its chromosome expressed in a linear string of genes. A new population is selected from among the current individuals in such a way that the individuals having higher fitness values will survive at higher probabilities. Out of the selected new population, a plurality of pairs are mated to become parents of the next generation.

The mated parent individuals are then subjected to a crossover process. Crossover algorithms combine one part of one parent chromosome with the other part of the other parent chromosome to produce another chromosome, thereby producing a new individual. The offspring individual produced through such a crossover process inherits some traits from both parents.

Each offspring is then subjected to a mutation process at a predetermined probability. The mutation process changes the genes located in certain loci of a chromosome to other values selected at random, thereby producing a new individual having acquired some genes that do not derive from its parents.

The new individuals produced in the above-described procedure make up the second generation population. Repeating the selection-crossover-mutation cycles, they will be succeeded by later generations. Finally, they form a population of individuals having high fitness values, while weeding out less fit individuals.

This final population contains the most-likely solutions as the optimal solution. Unlike the aforementioned hill-climbing methods, the genetic algorithms can avoid spurious convergence towards local optima which may be much worse than the true optimal solution, since the crossover and mutation processes permit a stochastic search to be performed with global coverage over the wide solution space.

Although this global search capability in the solution space certainly is a big advantage, the genetic algorithms require enormous computation power and thus consume too much time to solve various problems available in real life.

For instance, genetic algorithms can be used to solve a commodity delivery problem under a variety of constraints such as delivery costs, business hours of a distribution center, office hours of acceptance desks at destination sites. When all those constraints are taken into consideration, the problem solver should search the vast complex solution space to find an optimal solution. Even with the latest computer systems of today, it is not easy to obtain an optimal solution within a realistic time frame.

SUMMARY OF THE INVENTION

Taking the above into consideration, an object of the present invention is to provide a problem solver apparatus for solving mathematical programming problems, which is capable of finding better solutions at a higher speed.

Another object of the present invention is to provide a delivery planning system capable of finding better plans at a higher speed.

To accomplish the above objects, according to the present invention, there is provided a problem solver apparatus for solving an optimization problem. The apparatus comprises searching strategy optimization means for creating a population of individuals each of which has a chromosome specifying a solution searching strategy and optimizing the solution searching strategies by using a genetic algorithm, and solution searching means for finding candidate solutions in accordance with the solution searching strategies specified by the chromosomes of the individuals.

To accomplish the above objects, there is also provided a delivery planning system for solving a delivery planning problem, where a plurality of carriers deliver packages from a distribution center to different destinations under given constraints. The system comprises searching strategy optimization means for creating a population of individuals each of which has a chromosome specifying a solution searching strategy and optimizing the solution searching strategies by using a genetic algorithm, and solution searching means for formulating proposed delivery plans in accordance with the solution searching strategies specified by the chromosomes of the individuals.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENT

An embodiment of the present invention will be described below with reference to the drawings.

Figure 1:
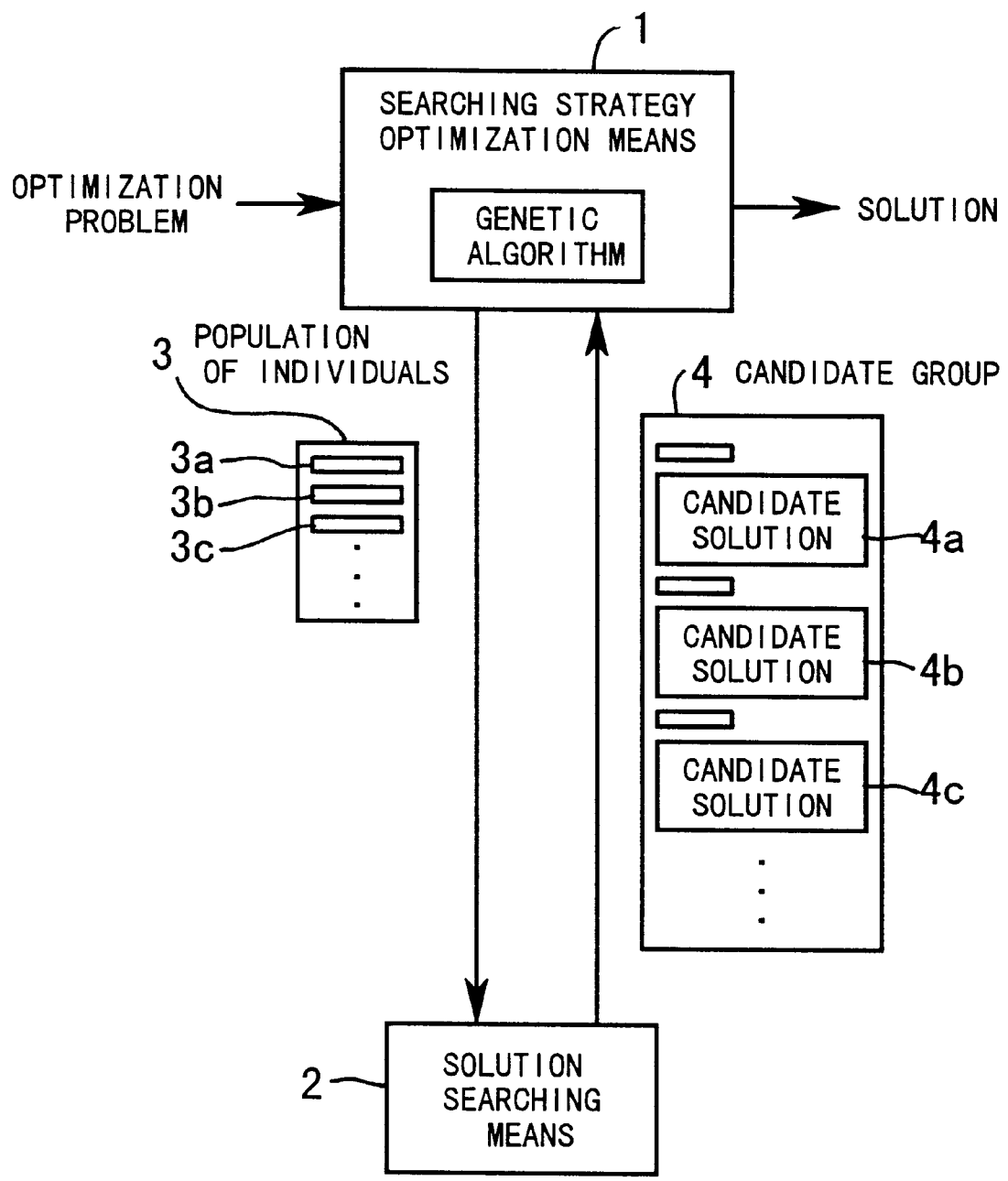
FIG. 1 is a conceptual view of a problem solver for solving mathematical programming problems according to the present invention.

FIG. 1 is a conceptual view of a problem solver for solving mathematical programming problems, or optimization problems, according to the present invention. When an optimization problem is entered to this problem solver, searching strategy optimization means 1 creates individuals 3a–3c using a genetic algorithm. The individuals 3a–3c have their respective chromosomes, each of which indicates a strategy for solution search. A population 3, organized by those individuals 3a–3c, is then sent to solution searching means 2.

The solution searching means 2 searches for solutions according to the strategies respectively indicated by the chromosomes of the individuals 3a–3c included in the population 3, thus obtaining candidate solutions 4a–4c. Note that those candidate solutions 4a, 4b, and 4c are produced independently, based on the different individuals 3a, 3b, and 3c, respectively. A candidate group 4, formed by the candidate solutions 4a–4c, is passed to the searching strategy optimization means 1.

The searching strategy optimization means 1 calculates fitness values of respective candidate solutions 4a–4c included in the candidate group 4. When it is necessary to search for the next-generation candidates, the searching strategy optimization means 1 applies the selection, crossover, and mutation processes to the individuals 3a–3c with reference to their respective fitness values, thereby producing new individuals of the next generation. The searching strategy optimization means 1 directs the produced next generation population to the solution searching means 2. If there is no need to search for the next-generation candidates, the fittest candidate solution is chosen as the final solution of the optimization problem. Although this final solution, in most cases, is not the exact optimal solution in a strict sense, it is merely an acceptable solution, which exhibits a relatively excellent fitness value within a predetermined range.

In the way described above, the problem solver of the present invention employs the cyclic processes of: optimizing solution searching strategies using a genetic algorithm, carrying out a search according to the strategy being optimized, and feeding the search result back to the next strategy optimization. Actually, the two processes of finding solutions and optimizing the solution searching strategies are running in parallel, and one's output is used as the other's input for the next cycle.

It should be noted here that the solution search is based on a high-speed algorithm other than the genetic algorithms. The problem solver of the present invention can process a problem faster than such a solver that fully uses genetic algorithms in all searching operations required. Furthermore, because the genetic algorithm is used to formulate the strategy, the problem solver of the present invention enjoys the advantages of global searching capabilities allowing the search to encompass the vast solution space.

The above-described problem solver can be used to solve a variety of optimization problems. Delivery planning problem is a typical problem of this kind. The following description will be devoted to the explanation for a delivery planning system in which the problem solver of the present invention is implemented.

Figure 2:
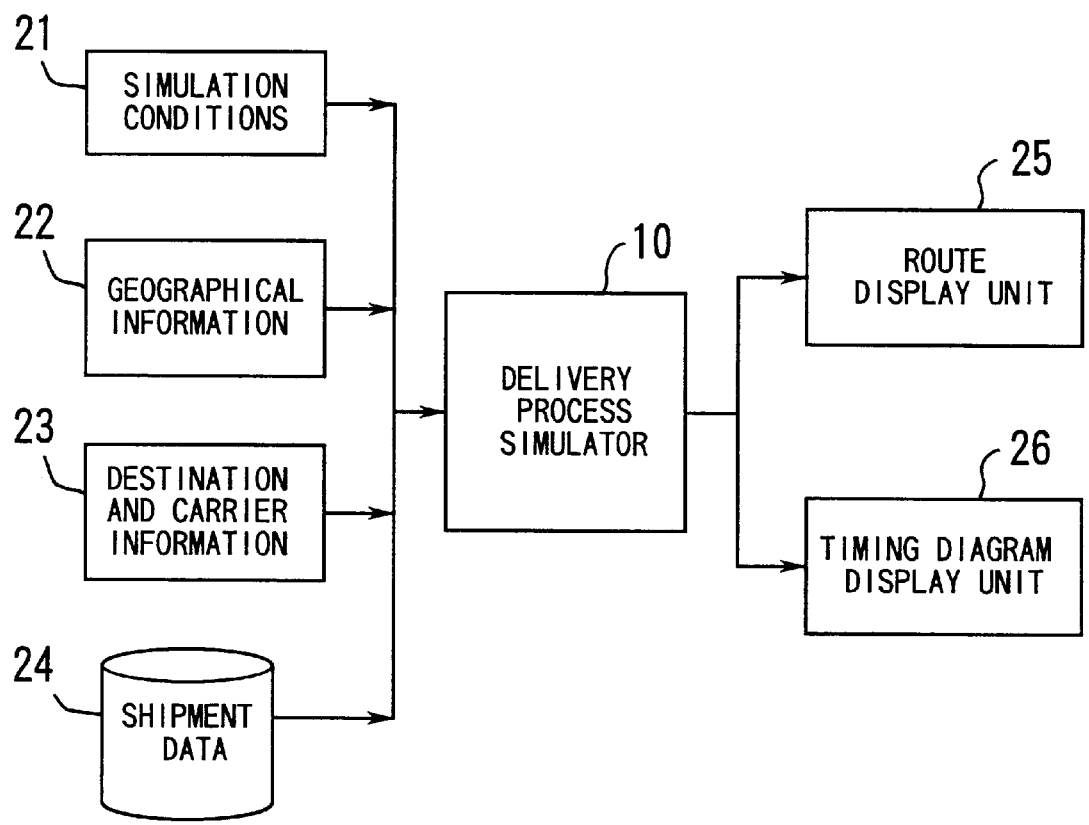
FIG. 2 is a total block diagram outlining a delivery planning system.

FIG. 2 is a total block diagram outlining a delivery planning system according to the present invention, where a delivery process simulator 10 plays a crucial role. Using both genetic algorithms and OR-based searching techniques, the delivery process simulator 10 executes computational tasks for delivery planning.

To perform the above mission, the delivery process simulator 10 requires inputs of simulation conditions 21, geographical information 22, destination and carrier information 23, and shipment data 24. The simulation conditions 21 include constraints, a fitness evaluation function, the maximum number of generations to be produced by the genetic algorithm, and other conditions used in the simulation. The geographical information 22 contains the location of each destination, the time for traveling from destination to destination, traffic information, and the like. The destination and carrier information 23 includes some conditions specific to the destination sites, such as designated delivery times, office hours of delivery acceptance desks, and types of motor carriers that are not allowed to park. The shipment data 24, which is sent from a central system that manages purchase orders and inventories, contains invoice information descriptive of the goods to be delivered.

Having received necessary information, the delivery process simulator 10 calculates a delivery plan and sends it to a route display unit 25 and timing diagram display unit 26. The route display unit 25 opens a map window on a display screen to show a map of the area serviced by the distribution center and draws the planned delivery routes.

Separately from the map window, the timing diagram display unit 26 opens a timing diagram window on the display screen. In this timing diagram window, the state transition of a motor carrier assigned to each delivery route will be presented along the time axis, i.e., in the form of a timing diagram.

Figure 3:
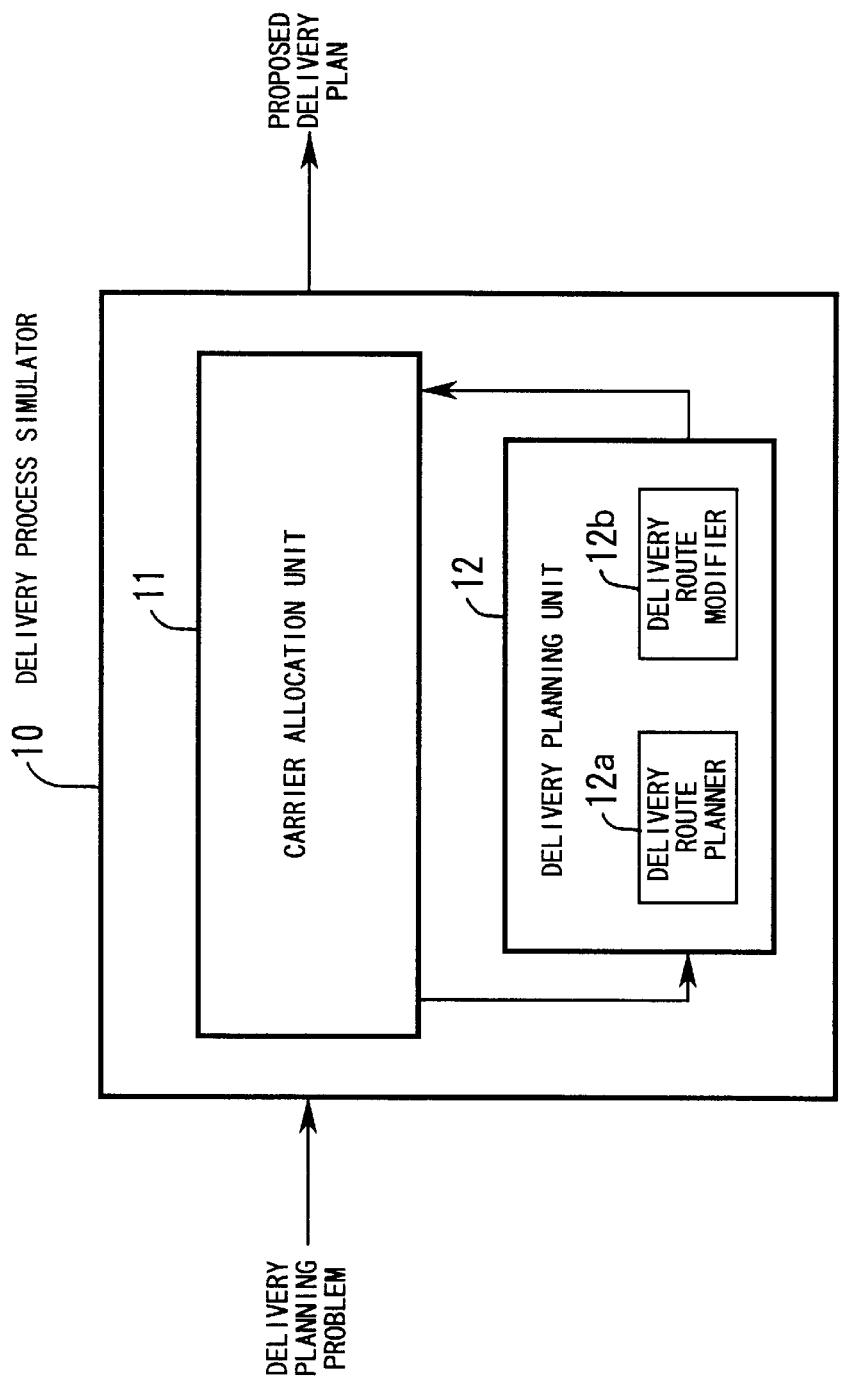
FIG. 3 is a block diagram showing the internal structure of a delivery process simulator.

FIG. 3 is a block diagram showing the internal structure of the delivery process simulator 10, which consists of a carrier allocation unit 11 and a delivery planning unit 12. With a genetic algorithm, the carrier allocation unit 11 optimizes the solution searching strategies, including the order of carriers to be allocated to the destinations. Under the strategies specified by the carrier allocation unit 11, the delivery planning unit 12 formulates delivery plans with OR-based methods.

The carrier allocation unit 11, in which a genetic algorithm is implemented, repetitively applies the genetic operators (i.e., selection, crossover, and mutation) to the individuals, whose chromosomes represent different solution searching strategies. The population of individuals thus produce their offspring successively. Each of the solution searching strategies consists of some control parameters such as: order of motor carriers to be allocated to the destinations, initial destination to which the first-ordered motor carrier should visit first if possible, and direction of scanning destinations. Full details of those parameters will be described later, with reference to FIG. 5.

The carrier allocation unit 11 starts genetic selection with transferring the population of individuals of the current generation to the delivery planning unit 12. In return, the carrier allocation unit 11 receives a plurality of proposed delivery plans respectively corresponding to the individuals. Then the fitness of the proposed delivery plans is evaluated, and based on their fitness values, the carrier allocation unit 11 selects the fittest individuals out of the present population and mates them with one another to produce the next generation. When a predetermined condition for terminating the process is satisfied, the proposed delivery plan with the largest fitness value in the population of the current generation is chosen as the optimal solution.

The delivery planning unit 12 consists of a delivery route planner 12a and a delivery route modifier 12b. Upon receipt of a population of a certain generation from the carrier allocation unit 11, the delivery route planner 12a selects motor carriers in the order specified in the chromosome of each individual and produces provisional delivery routes by assigning appropriate destinations to each of the selected carriers, or each subject carrier. The delivery route modifier 12b receives the provisional delivery routes, and for each of the routes, it rearranges the order of visiting the destinations so as to minimize the total time required to deliver all the packages loaded on the subject carrier. The delivery route modified in this way will serve as a new delivery route planned for that subject carrier. By finalizing such new delivery routes for all the carriers involved, the delivery planning unit 12 produces a proposed delivery plan corresponding to each individual. After repeating the above process for all the given individuals, the delivery planning unit 12 supplies a set of proposed delivery plans to the carrier allocation unit 11.

As such, the delivery planning system solves the problem using a combined method of a genetic algorithm and OR-based techniques. The following description will explain how the system processes a delivery planning problem by way of example.

Figure 4:
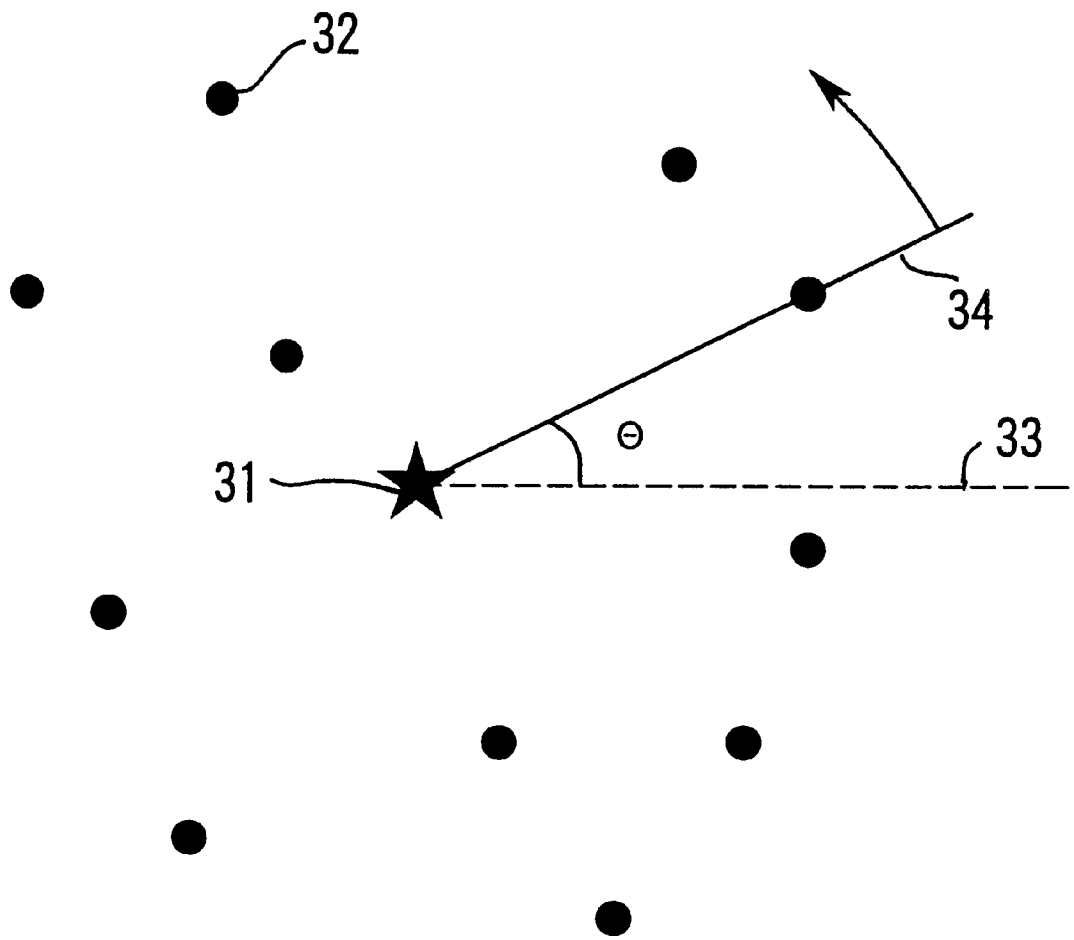
FIG. 4 is a diagram showing a model of a delivery planning problem in which a distribution center and several destinations are involved.

FIG. 4 shows a model of a delivery planning problem in which a distribution center 31 and several destinations 32 are involved. The objective in this example case is to minimize the number of vehicles used for delivering packages to the destinations 32 from the distribution center 31. Every location in this two-dimensional space is expressed in reference to a polar coordinate system whose origin is located at the distribution center 31. A line 34 drawn through the origin is used to scan the area to pick up a destination, which will be examined as a target destination in a carrier allocation process described later. A broken line 33 in FIG. 4 shows the reference frame to measure the rotation angle θ of the line 34. The line 34 sweeps the entire area in a specified destination scanning direction, either counterclockwise (i.e., increasing the angle θ) or clockwise (i.e., decreasing the angle θ).

This example problem include the following constraints:
1) Limited business hours of the distribution center.

2) Limited office hours of a delivery acceptance desk at each destination site.

3) Limited access to the destinations, including constraints due to bad traffic conditions (e.g., there is a too narrow alley for some carriers to reach a certain destination).

4) Limited types of motor carriers that are allowed to enter (e.g., some destination sites requests that their company logotypes be printed on the body of a motor carrier).

5) Limited load capacity of each motor carrier, including limitations in the maximum carrying weight, volume, and dimension.

6) Availability of temperature control facility in each motor carrier.

7) Limited operating hour of each carrier.

8) Limited total mileage of each carrier.

9) Limited number of carriers.

The ultimate goal of this example case is to reduce the delivery costs. Actually, there are several factors to determine the delivery costs, such as the number of carriers used, the time required for delivery that affects labor costs, and the total mileage of the motor carrier that affects fuel economy. In the present case, reduction of the number of carriers is chosen as the primary objective of the optimization, while reduction of total loading capacity is also evaluated as the secondary objective. Each motor carrier requires high upkeep costs every year, and therefore, reducing the number of carriers in the distribution center is considered to be the most dominant factor for the delivery cost reduction.

Here is a fitness function fk defined for the k-th delivery plan which derives from the solution searching strategy specified by the k-th individual.

$$fk=1/(a \times Nk+b \times Wk+c \times Sk) \quad (1)$$

where weighting coefficients a, b, and c are predetermined real-valued constants, Nk is the number of carriers required, Wk is the total loading capacity of the carriers in use, and Sk is a factor that indicates shortage of carriers. The last-mentioned Sk is a binary-valued factor that exhibits "1" if the number of carriers required is greater than that of the actual holdings, or set to "0" otherwise. A solution that maximizes the fitness function fk will minimize the required number of carriers and total loading capacity of the carriers in use. The weighting coefficient c is selected to be much larger than the other coefficients a and b, so that the genetic selection process will weed out at high probabilities such individuals as only producing poor solutions that require too many carriers.

Here, the selection probability Ps is expressed as $$Ps=fk^n/\Sigma(fk^n) \quad (2)$$

where exponent n is a real-valued adjustment factor for the selection. Note that the fitness value fk is raised to the n-th power in order that the severity of selection can be easily adjusted by changing the exponent n. That is, highly fit individuals are more likely to survive at high probabilities, when a large exponent n is given. In contrast, a small exponent n will allow even less fit individuals to be also selected at increased probabilities.

Figure 5:
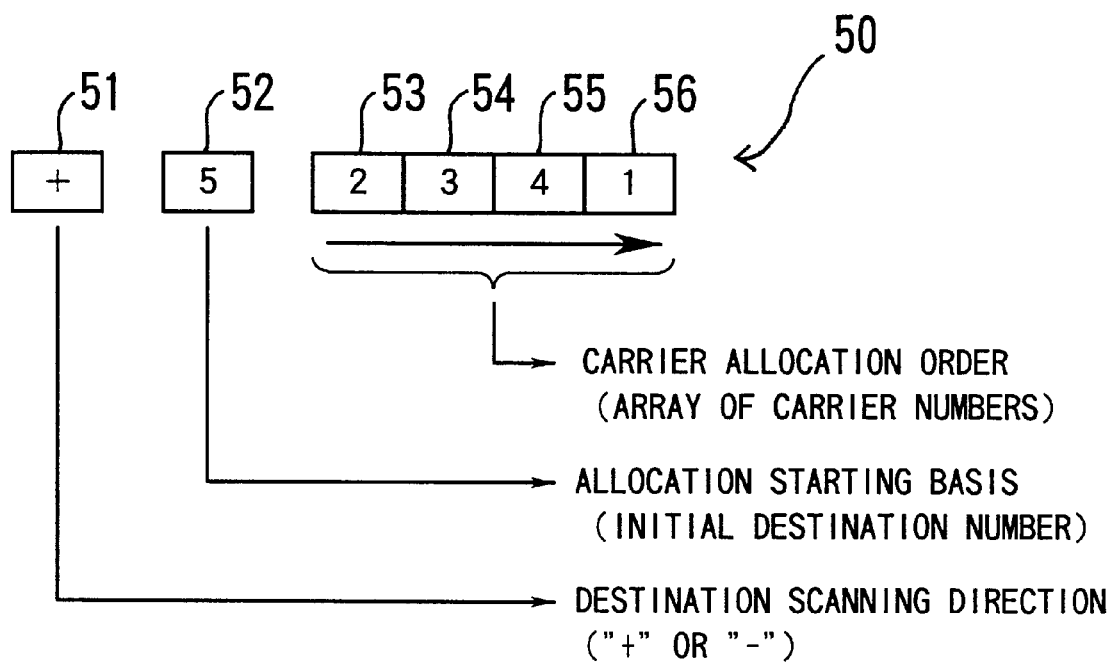
FIG. 5 is a diagram showing the structure of a chromosome.

Each individual's chromosome has three sections to represent carrier allocation order, allocation starting basis, and destination scanning direction. FIG. 5 illustrates a chromosome having such internal structure. A chromosome 50 has six genes 51–56, which can be subdivided into three parts as: 51, 52, and 53–56.

The first section of a chromosome, or the gene 51, has a value of "+" or "−" indicative of destination scanning direction. When this gene 51 is set to "+" (i.e., a positive direction), the delivery planning system will scan the destinations mapped on the aforementioned polar coordinate system, in such a direction that the angle θ increases, thus selecting target destinations. When this gene 51 is set to "−" (i.e., a negative direction), the system will scan the destinations in the opposite direction.

The second section, or the gene 52, represents a destination number to specify a destination from which the delivery route planner 12a starts scanning the destinations. Namely, the gene 52 designates the destination as "allocation starting basis."

The third section, or the remaining genes 53–56, expresses the order of motor carriers that are subjected to a procedure to allocate them to appropriate destinations. More specifically, the carrier allocation procedure starts with a motor carrier designated by the gene 53, and then proceeds to the genes 54, 55, and 56 in a serial manner, where appropriate destinations are assigned to each subject carrier specified by those genes.

The crossover and mutation processes are conducted separately for the above-described three sections of each chromosome. The present embodiment uses a two-point crossover algorithm, where each chromosome is divided at two cut points: one point between the first and second sections and another point between the second and third sections. The separated sections of two parent chromosomes are recombined to form the next generation chromosomes.

Following the two-point crossover, the mutation process causes a change to the first and/or second sections of a chromosome at a certain probability. Concerning the third section, which represents the order of motor carriers, the mutation process causes permutation of two genes belonging to that section at a certain probability.

The delivery process simulator 10 (see FIG. 2) starts searching for the optimal solution of the given delivery planning problem, using the genetic information contained in each chromosome. The search is accomplished mainly by the carrier allocation unit 11.

Figure 6:
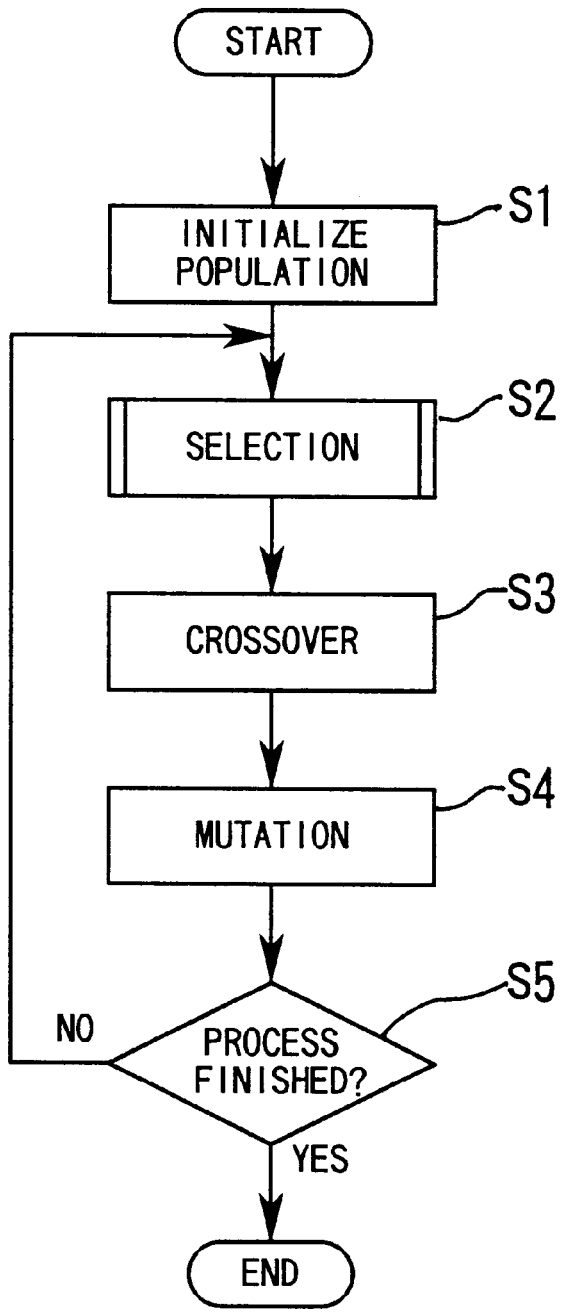
FIG. 6 is a flowchart showing a procedure executed by a carrier allocation unit.

FIG. 6 is a flowchart showing a procedure executed by the carrier allocation unit 11, which comprises the following steps.

[S1] As an initial population subject to evolution, the delivery process simulator 10 produces a first-generation population of individuals. The individuals of the first generation have appropriate combinations of genes, which may be selected in a random manner, for example.

[S2] Based on a predetermined criterion, a plurality of pairs of individuals are selected out of the population. The details of this step will be presented later, with reference to FIG. 7.

[S3] The delivery process simulator 10 creates new chromosomes by applying the above-described two-point crossover algorithm to the chromosomes of each individual pair selected in step S2.

[S4] At a certain probability, the above-described mutation process is applied to the new chromosomes produced in step S3. The individuals having the new chromosomes produced in steps S2 to S4 now form the next generation population.

[S5] It is examined whether the process should be terminated or not. For example, it is tested whether the number of generations has reached a predetermined limit or not. If the current generation does not satisfy such a predetermined condition for the termination, the process returns to step S2 to perform another cycle of solution search with the next generation individuals. If the terminal condition is met, the fittest solution among the proposed delivery plans of the current generation is chosen as the final acceptable solution.

Figure 7:
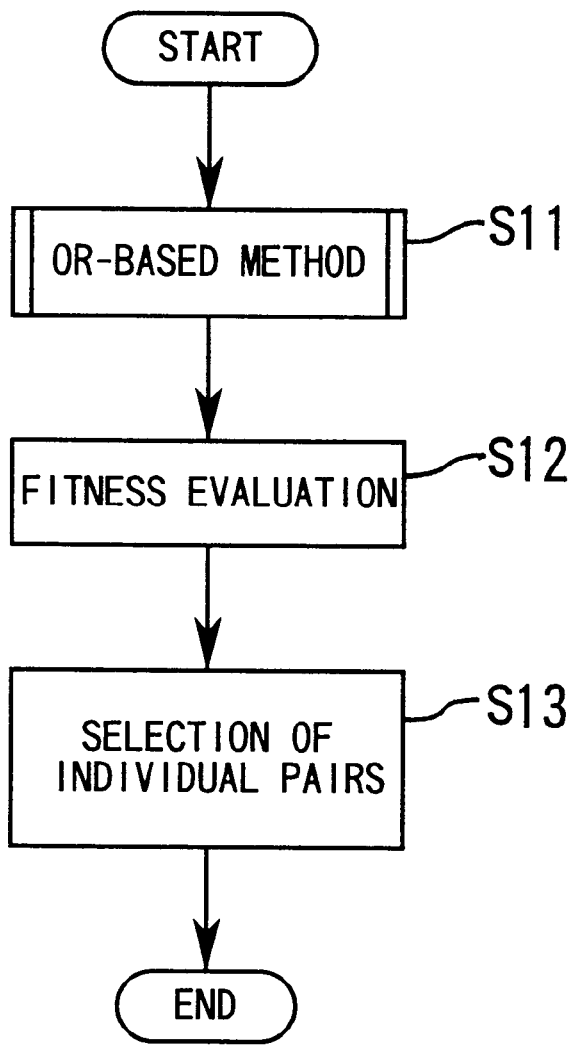
FIG. 7 is a flowchart showing a selection process.

FIG. 7 is a flowchart showing the details of the genetic selection process mentioned above, which is performed in the following steps.

[S11] The carrier allocation unit 11 supplies the population to the delivery planning unit 12 and receives, in turn, a set of proposed delivery plans developed through OR-based methods.

[S12] The carrier allocation unit 11 evaluates the fitness of each proposed delivery plan received from the delivery planning unit 12.

[S13] Based on the fitness values, the carrier allocation unit 11 selects a plurality of individual pairs.

Figure 8:
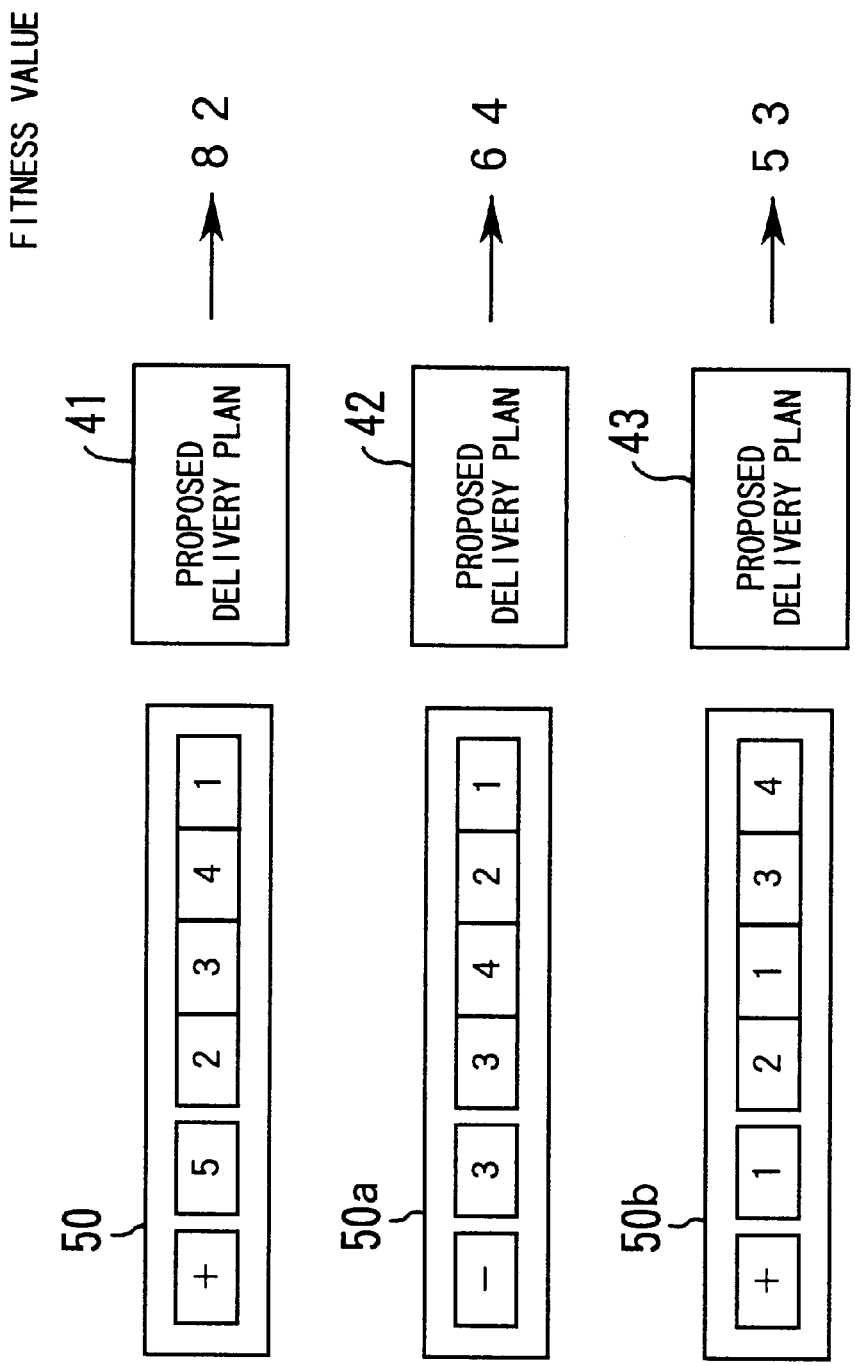
FIG. 8 is a diagram showing some combinations of an individual, chromosome, and proposed delivery plan.

FIG. 8 illustrates three examples of what data the carrier allocation unit 11 sends and receives in step S11. Each instance shows an individual and its chromosome that the carrier allocation unit 11 sends to the delivery planning unit 12, and a delivery plan that it receives in return for them. The carrier allocation unit 11 evaluates those chromosomes 50, 50a, and 50b by calculating the fitness values of delivery plans 41, 42, and 43 derived from them, respectively.

Figure 9:
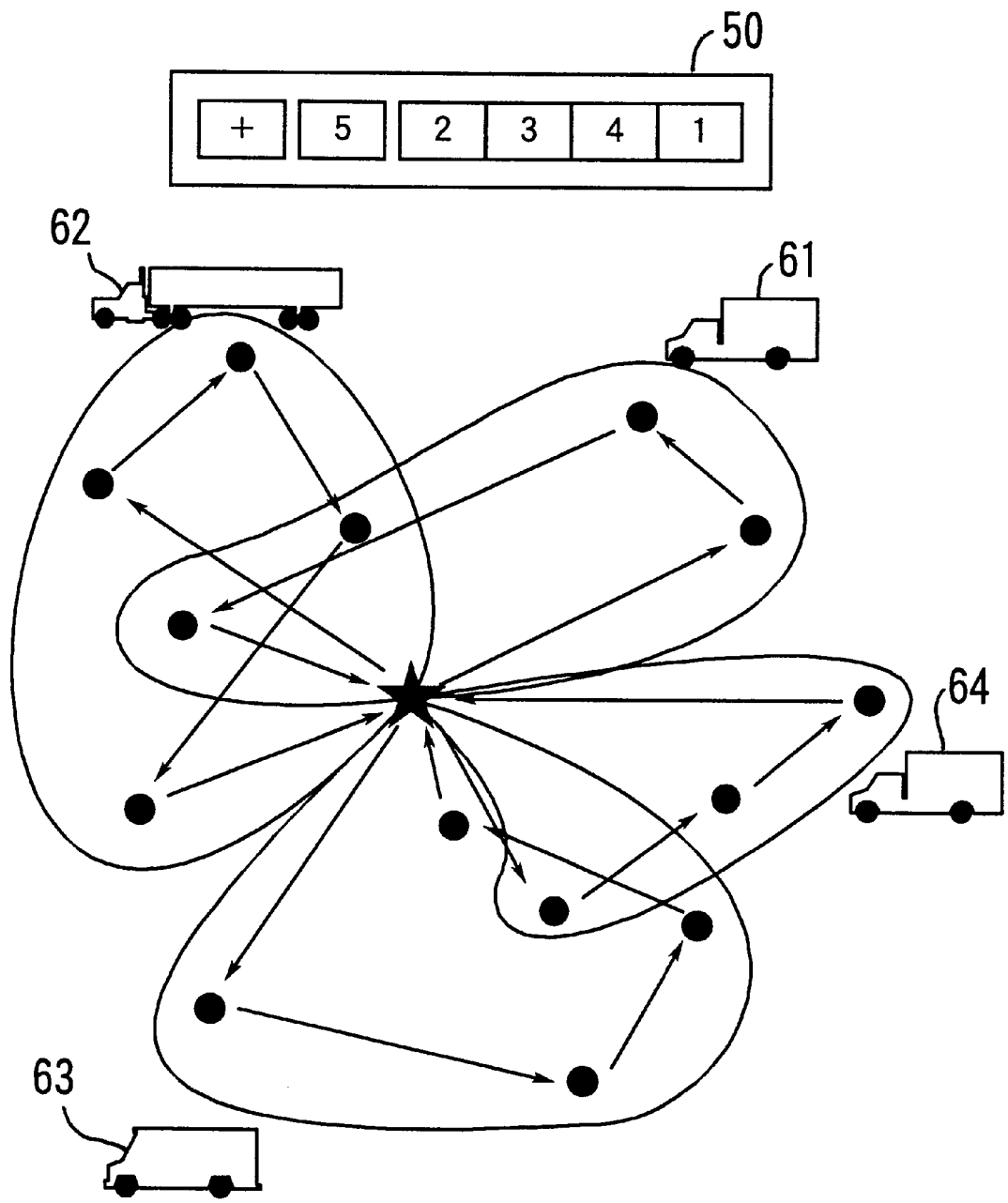
FIG. 9 is a diagram showing the contents of a proposed delivery plan.

FIG. 9 depicts the contents of a delivery plan proposed by the delivery planning unit 12 in accordance with a solution searching strategy that the chromosome 50 specifies. As seen in FIG. 9, the proposed delivery plan includes information on which destinations are assigned to each of motor carriers 61–64 and in what order they visit the destinations.

That concludes the procedure executed by the carrier allocation unit 11. The following description will be devoted to the delivery planning unit 12.

Figure 10:
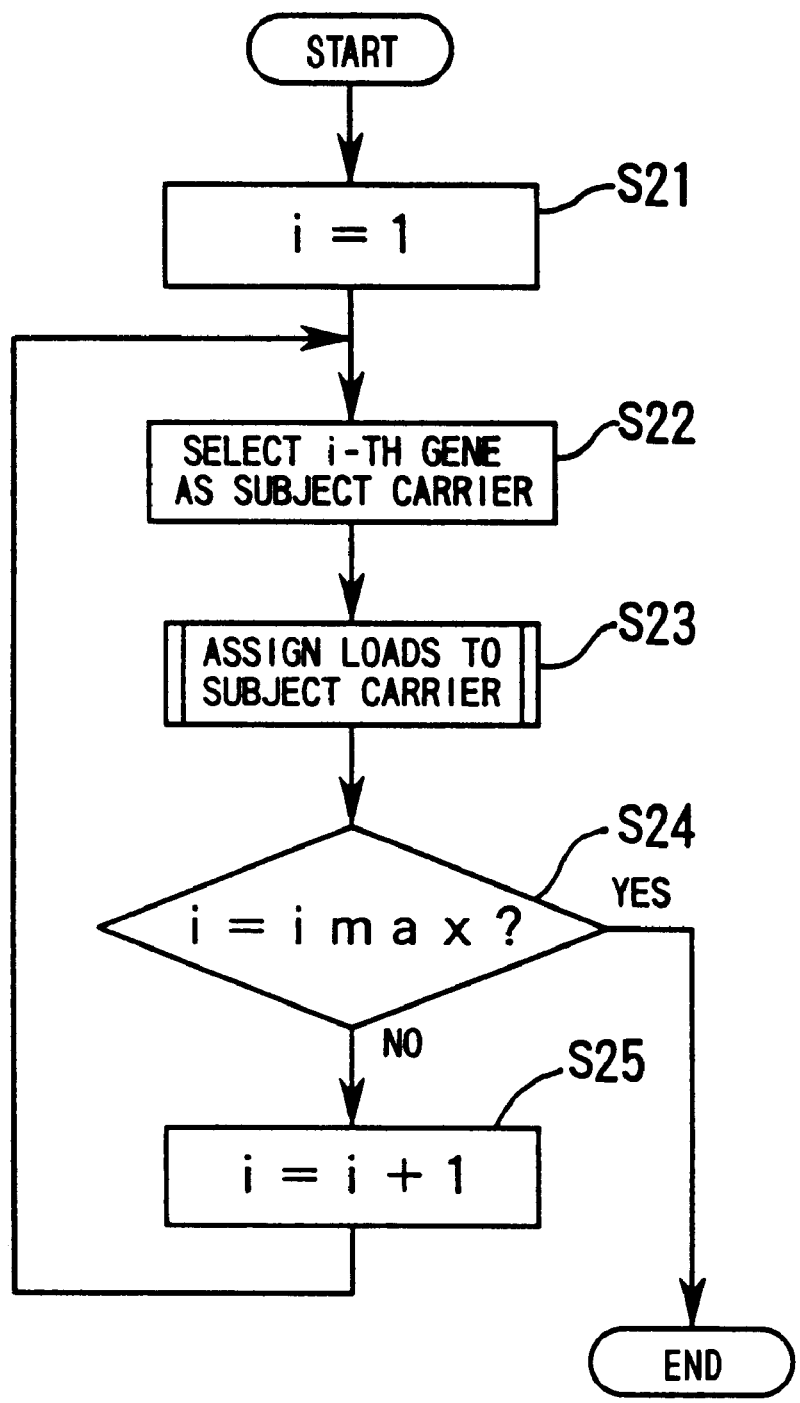
FIG. 10 is a flowchart showing a procedure executed by the delivery planning unit.

FIG. 10 is a flowchart showing a procedure executed by the delivery planning unit 12. The procedure comprises the following steps, which are handled by the delivery route planner 12a, unless otherwise noted.

[S21] An integer-valued variable i is initialized to "1."

[S22] The i-th gene is selected to begin allocation of a specific motor carrier, namely, a subject carrier. The ordinal number "i-th" locates a particular gene, by counting the slots from left to right, within a section of a chromosome that specifies the carrier allocation order. Take the chromosome 50 in FIG. 5 for example. The gene 53 is the first such gene, and the genes 54, 55, and 56 follow as the second, third, and fourth genes.

[S23] Assignment of loads to the subject carrier is processed in this step. The details of this step will be described later with reference to FIG. 11.

[S24] The variable i is compared with a predefined constant imax, the number of available motor carriers. If the variable i has not reached the constant imax, the process advances to the next step S25. The coincidence of the variable i and constant imax means that the process has completed for all the available carriers.

[S25] The process returns to step S22 after incrementing the variable i by one, thus repeating the steps S22 to S24 until the variable i reaches imax.

Figure 11:
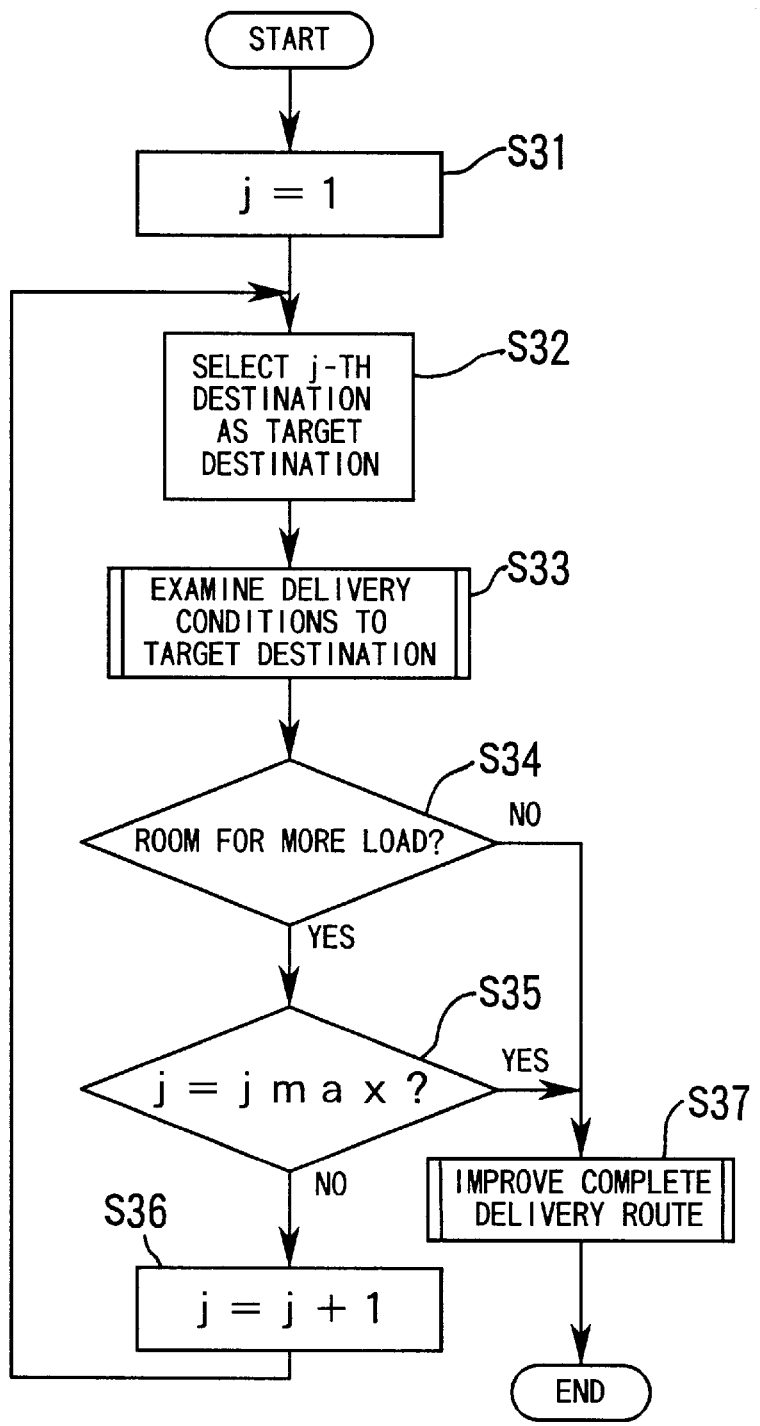
FIG. 11 is a flowchart showing a detailed process of assigning loads to a subject carrier.

FIG. 11 is a flowchart showing the detailed process of step S23 in FIG. 10 for determining loads for a subject carrier. The process comprises the following seven steps.

[S31] An integer-valued variable j is initialized to "1."

[S32] The j-th destination is selected as the target destination which is subjected to examination. As such, the number j is used to distinguish the target destinations.

Each time when starting the process of FIG. 11, sequential numbers are given to "unassigned" destinations that have not yet been assigned to any carriers. More specifically, the delivery route planner 12a scans the destinations from a certain starting angle in the polar coordinate system. For the first carrier, it is the angle for the allocation starting basis (i.e., the destination specified by the gene 52 shown in FIG. 5), and for the second and later carriers, the starting angle is set to be slightly larger than the first one. This scanning operation proceeds in the destination scanning direction (i.e., the direction specified by the gene 51 shown in FIG. 5), while assigning a unique sequential number to each destination as found unassigned. The number given to the last found unassigned destination is recorded as a constant jmax, which indicates the total number of unassigned destinations.

[S33] It is tested whether or not the subject carrier can deliver a package addressed to the target destination. Full details of this step will be described later, with reference to FIG. 13.

[S34] It is judged whether the subject carrier has room enough to carry more loads or not. If the subject carrier has enough room, the process advances to the next step S35. If there is no more room in the subject carrier, the process branches to step S37.

[S35] The variable j is compared with the predetermined constant jmax, the last number of unassigned destinations. If the variable j has not reached the constant jmax, the process advances to the next step S36. The coincidence of the variable j and constant jmax means that the examination has completed for all the unassigned destinations.

[S36] The process returns to step S32 after incrementing the variable j by one, thus repeating the steps S32 to S35 until the variable j reaches jmax or the amount of the total load exceeds the limit.

[S37] After conducting some improvement of the final delivery route by the delivery route modifier 12b, the delivery planning unit 12 terminates the process. Full details of this step S37 will be separately described with reference to FIG. 16.

Figure 12A:
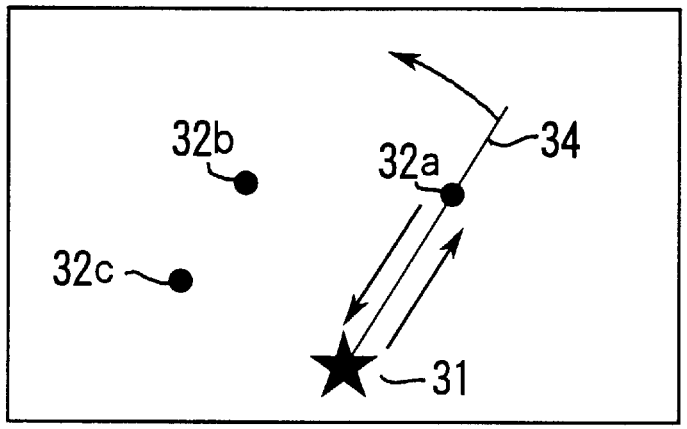
FIGS. 12(A), 12(B), and 12(C) are diagrams illustrating how the load assignment process progresses with regard to the first, second, and third destinations, respectively.
Figure 12B:
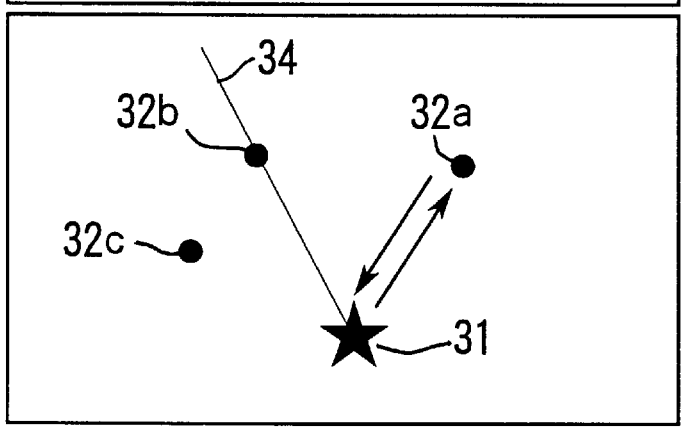
Figure 12C:
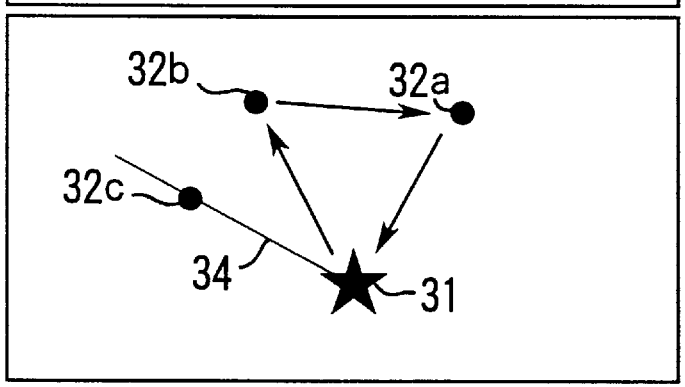

FIGS. 12(A)–12(C) illustrate how the load assignment process proceeds.

Specifically, FIG. 12(A) shows how the delivery route planner 12a examines the first destination 32a. In this example, the delivery planner 12a judges that the package can be loaded to the subject carrier and creates a round trip route between the distribution center 31 and destination 32a.

FIG. 12(B) shows how the second destination is processed. In the current session, the destination scanning direction is set to the "+" direction, and thus a destination 32b should be selected next to the destination 32a. The delivery route planner 12a judges that a package to the destination 32b can also be loaded to the subject carrier and determines the new delivery route. Here, it is an option in this situation whether the carrier should drop in the destination 32b on the way to the destination 32a or on the way back from the destination 32a. The delivery planning unit 12 has to evaluate both routes and choose better one in terms of the time cost and observance of the constraints. FIG. 12(B) shows that the delivery route planner 12a decided to take the former route.

FIG. 12(C) shows how the third destination is processed. In the current session, a destination 32c is numbered as the third destination. The delivery route planner 12a tests whether the delivery to the destination 32c is possible or not in terms of observance of the constraints except for the time-related constraints such as office hours of the acceptance desk at the destination 32c. After confirming feasibility of delivery, the delivery route planner 12a actually begins a search for a delivery route to the destination 32c. This additional destination 32c may cut into either one of three existing connection paths: between the distribution center 31 and destination 32b, between the destination 32b and destination 32a, and between the destination 32a and distribution center 31. The delivery route planner 12a compares those three options, finds the optimal one out of them, and decides to choose it as a solution if it does not violate any constraints. Otherwise, the delivery route planner 12a does not take the destination 32c into the delivery route (delivery schedule) for this subject carrier.

Figure 12D:
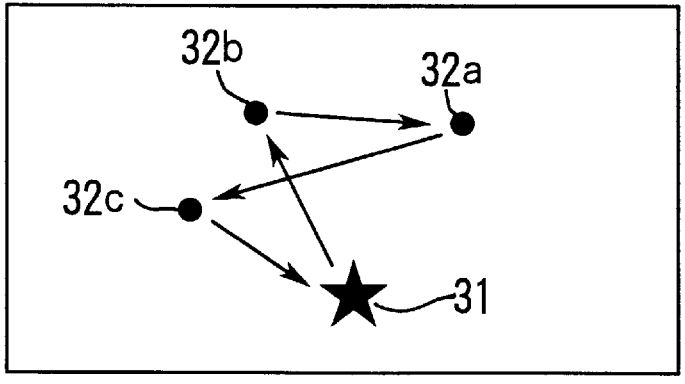
FIG. 12(D) is a diagram showing the result of the load assignment process for the three destinations.

FIG. 12(D) shows the result of the above-described routing process. In this case the delivery route planner 12a awarded honor of the optimal route to the delivery route that visits the destinations in the order of 32b–32a–32c and returns to the distribution center.

Figure 13:
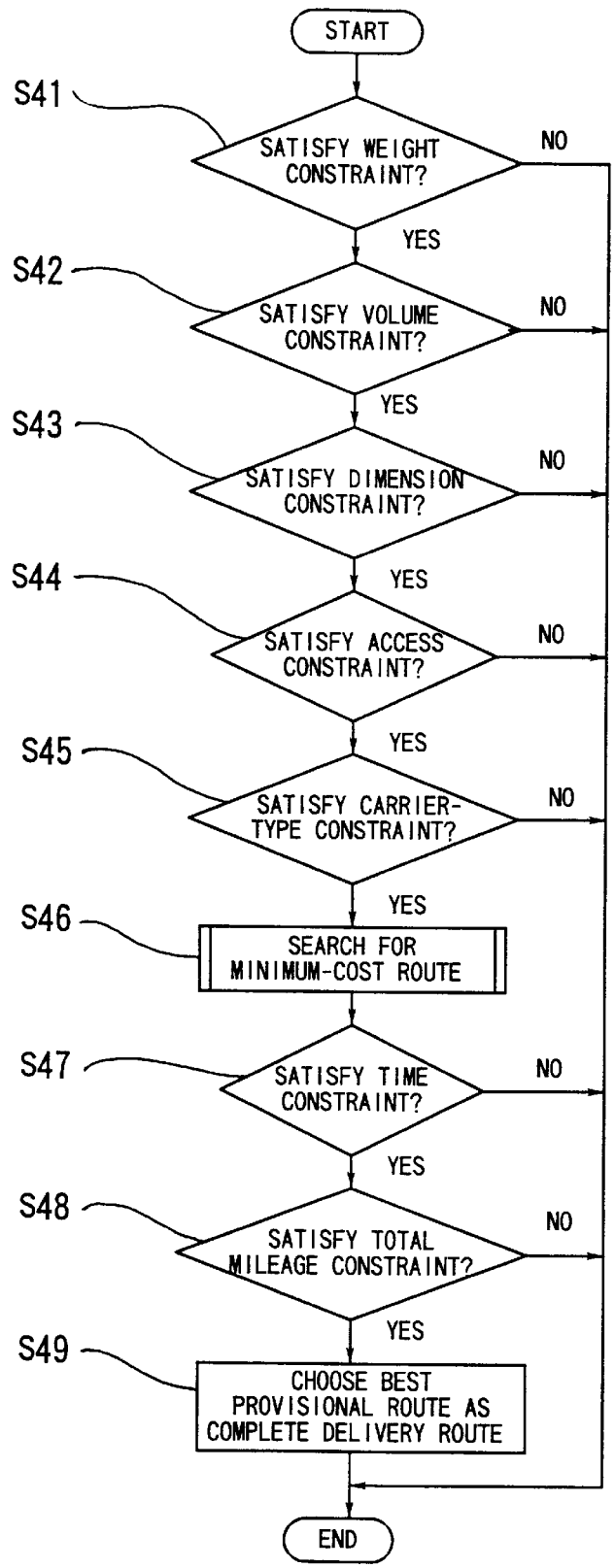
FIG. 13 is a flowchart showing a detailed process of planning a delivery to a target destination.

FIG. 13 is a flowchart showing a detailed process of examining feasibility of delivering a specific package addressed to a target destination, as was once mentioned in step S33 of FIG. 11.

[S41] The delivery route planner 12a examines whether or not the addition of a package addressed to the target destination satisfies the weight constraint of the subject carrier. If it satisfies the weight constraint, the process advances to the next step S42. Otherwise, the process is terminated without providing any proposed delivery route.

[S42] The delivery route planner 12a examines whether the additional package satisfies the volume constraint of the subject carrier or not. If it satisfies the volume constraint, the process advances to the next step S43. Otherwise, the process is terminated without providing any proposal.

[S43] The delivery route planner 12a examines whether the additional package satisfies the dimension constraint of the subject carrier or not. If it satisfies the dimension constraint, the process advances to the next step S44. Otherwise, the process is terminated without providing any proposal.

[S44] The delivery route planner 12a examines whether there is no such an alley that is too narrow for the subject carrier to pass through before reaching the destination of the additional package. If it satisfies this access constraint (i.e., if the subject carrier can reach the destination), the process advances to the next step S45. Otherwise, the process is terminated without providing any proposal.

[S45] The delivery route planner 12a examines whether or not the subject carrier is among the types that will be accepted by the site for which the additional package is destined. If it satisfies this carrier-type constraint, the process advances to the next step S46. Otherwise, the process is terminated without providing any proposal.

[S46] The delivery route planner 12a tries to find a delivery route which enables the subject carrier to visit the target destination at the minimum cost, thus discovering a provisional delivery route. Full details of this step will be described later with reference to FIG. 14.

[S47] The delivery route planner 12a examines whether the provisional delivery route satisfies the time constraint or not. If it satisfies the time constraints, the process advances to the next step S48. Otherwise, the process is terminated without providing any proposal.

[S48] The delivery route planner 12a examines whether or not the total mileage of the subject carrier is still within a predetermined limit. If it satisfies this total mileage constraint, the process advances to the next step S49. Otherwise, the process is terminated without providing any proposal.

[S49] The delivery route planner 12a authorizes the provisional delivery route as the final delivery route and terminates the process.

Figure 14:
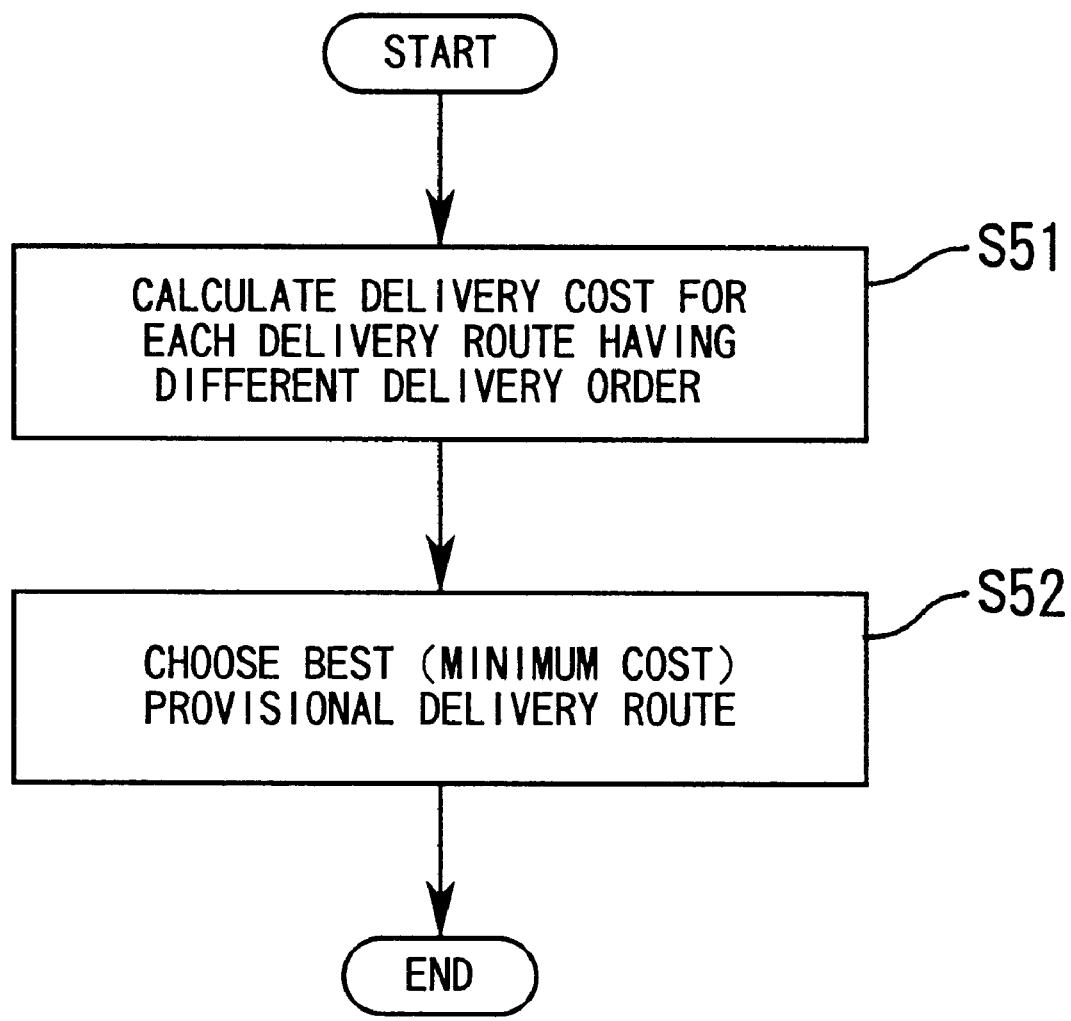
FIG. 14 is a flowchart showing a detailed process of finding a minimum-cost route to a target destination.

FIG. 14 is a flowchart showing a detailed process of finding the minimum-cost route mentioned in step S46.

[S51] The delivery route planner 12a calculates delivery cost for every possible variation of the delivery route where the carrier visits the target destination in different order of delivery. Here, the delivery cost is defined by a function of several factors including the total traveling time, total driving hours, total driving distance, and total fuel cost.

[S52] The target destination should be inserted into one of the connection paths constituting the current delivery route so that the delivery cost will be minimized. Under the given time-constraints, the delivery route planner 12a selects such a minimum-cost solution out of various possible delivery routes which were evaluated in the previous step S51. The route proposed by the delivery planner 12a in this way is referred to as the provisional delivery route, which minimizes the delivery cost as well as observing the time constraints.

Figure 15:
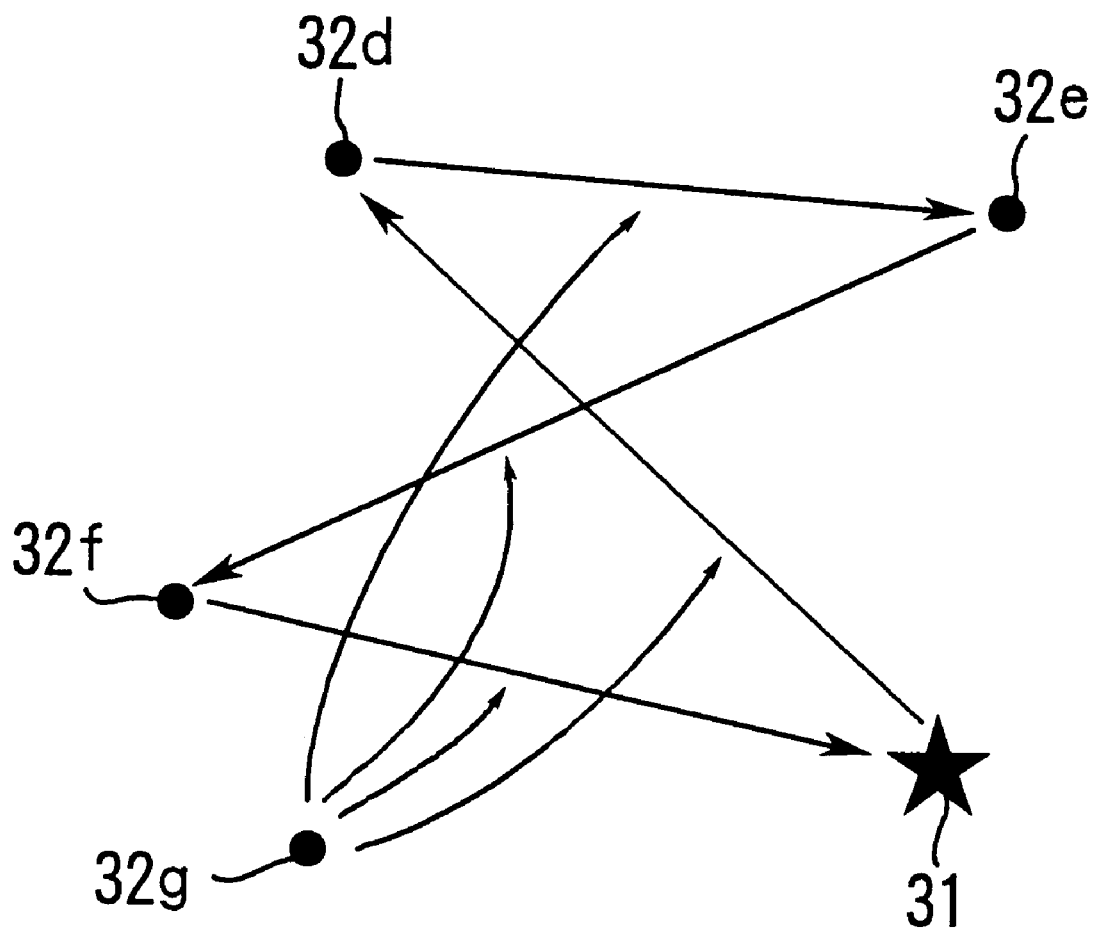
FIG. 15 is a diagram explaining details of step S51 of FIG. 14.

FIG. 15 explains the details of steps S51 and S52 in the flowchart shown in FIG. 14. FIG. 15 assumes such a situation that the delivery route planner 12a is seeking a delivery route for a new destination 32g, while there is an established delivery route that starts from the distribution center 31, visits destinations 32d, 32e, and 32f, and then returns to the distribution center 31.

Apparently, there are four possible connection paths to which the new destination 32g can be inserted. The delivery route planner 12a selects the most economical path out of those candidates, calculating and comparing their respective delivery costs. In this path selection process, the given time-constraints are also taken into consideration. The delivery route planner 12a modifies the current delivery route so that the destination 32g be inserted into the middle of the selected connection path, thus producing the new provisional delivery route. If the delivery route planner 12a fails to formulate such provisional delivery route because of the time-constraints, it returns a route that violates the time-constraints, thereby causing the process flow to branch away at step S47 (see FIG. 13).

Figure 16:
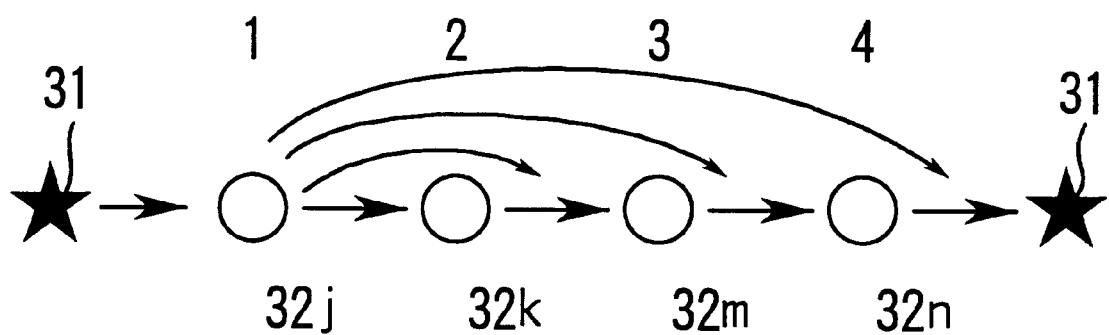
FIG. 16 is a diagram explaining details of step S37 of FIG. 11.

FIG. 16 is a diagram explaining details of step S37 in the flowchart in FIG. 11. It is assumed that there is a provisional delivery route that starts from the distribution center 31, visits destinations 32j, 32k, 32m, and 32n, and then returns to the distribution center 31. FIGS. "1" to "4" above the destinations indicate the order of delivery.

In step S37, the delivery route modifier 12b tests whether the delivery cost will increase or decrease by moving the destination 32j to other place, while maintaining observance of the given constraints. If there is a good place that reduces the delivery cost, the destination 32j will be relocated to that place.

Assume here that the destination 32j has moved to a new position between the destinations 32m and 32n, for example. This change causes a shift of the destinations 32k and 32m to the earlier stages (i.e., from right to left in FIG. 16), and as a result, the destination 32k becomes the first place to visit. Now that the new order is given, the delivery route modifier 12b examines again whether the delivery cost can be reduced or not by moving the destination 32k to any other place.

If such examination does not suggest any relocation of the first destination, the focus then moves to the second destination, or otherwise the third and fourth destinations in a similar manner. In this way, the best provisional delivery route is finally obtained. The above improvement by relocation will be repeated until it reaches a predetermined number of cycles.

Such improvement of the delivery route may produce some room in the delivery schedule. If this is the case, and if the subject carrier has enough capacity for additional loads, it may be possible to include another destination in the delivery schedule, as an optional process as part of the delivery planning algorithm.

According to the present invention, the delivery planning system works out the solution searching strategies using a genetic algorithm and formulates specific delivery plans using OR-based methods, thus enabling a high-quality acceptable solution to be quickly obtained. The delivery plans obtained through this process often exhibit much better performance than those made by hand, spending a comparable amount of time. It is possible in some cases to reduce the number of motor carriers by, for example, 30 percent or more. Although the computation time depends on the complexity of the problems and the performance of a computer used, some delivery planning problems with dozens of destinations can be solved in a few seconds by using workstations which are commonly available.

Conventional delivery planning systems are not powerful enough to solve some types of problems that involve a plurality of constraints. It is particularly difficult for the conventional systems to handle time constraints, since they need some complicated algorithms to be implemented. The delivery planning system of the present invention, however, can handle various constraints, including time constrains, with reasonable processing speeds. It is of course possible to specify both time and loading capacity constraints.

Such ability of quickly solving multiple-constraint problems derives from the distinct configuration of the present invention, where both genetic algorithm and OR-based method are properly used. That is, the system uses a genetic algorithm in global search and applies OR-based techniques to more detailed computation. The OR-based method used in the present invention takes up a subject carrier one by one, and then selects a target destination for each subject carrier also in a one-by-one manner. Each time a new subject carrier is taken up, the method proposes a delivery route and locally optimizes it as much as possible, by testing it in view of various constraints for each carrier's schedule and determining an appropriate delivery order. Such OR-based operations only require a smaller amount of computation, compared with other methods in which genetic algorithms are fully used to explore so vast solution space. Therefore, it is possible to get to one of the optimal solutions or a near-optimal solution in a shorter time even if a lot of constraints are imposed. Further, since the genetic algorithm is used to optimize the strategies for seeking solutions, the delivery planning system can scan the entire solution space from a global viewpoint to find one of the optimal solutions or a near-optimal solution.

In addition, the present invention develops a complete delivery route by incrementally adding new destinations to a delivery route under construction, and then brushes up that complete delivery route by rearranging the delivery order. Therefore, one of the best delivery routes or a near-best delivery route can be obtained regardless of the initial subject destination that is specified at the beginning of each searching process.

The coordinate system used to locate the distribution center and destinations can potentially be a Cartesian coordinate system, instead of a polar coordinate system as in the embodiment. In that case, the destination scanning direction will be specified as "$-\infty$ to $+\infty$ in X-axis direction", for example.

The origin of the polar coordinate system may not be restricted to the position of the distribution center but any other positions can be selected as the origin. For example, the barycenter (or center of gravity) of the entire set of destinations, including or not including the distribution center, will work as the origin of the coordinate system. Another alternative is the median of the same set, namely, the middle value of all the coordinate values at which the members of the set is divided into upper and lower halves or into left and right halves.

The above discussion about alternative origins is also appropriate to the Cartesian coordinate system. The location of the distribution center, the barycenter, the median, and other points may be selected as the proper origin.

The fitness function, which is targeted to the reduction of delivery costs in the present embodiment, may have other objectives. For example, the function can be defined so as to optimize the balance in loading of carriers. The fitness can also be evaluated in view of the degree of satisfaction of the maximum number of motor carriers and other given constraints, including compliance with the designated delivery times, for example. It is also possible to define such a fitness function that gives an appropriate weight to both factors of delivery cost reduction and compliance with the constraints.

The delivery planning unit 12 may be configured so that the duration of a stay at each destination will be taken into consideration when it assigns target destinations to a subject carrier with OR-based techniques. By introducing this additional factor, the delivery planning system can estimate the behavior of carriers more precisely, thus reducing potential errors involved in the resultant delivery plans.

Recall that the delivery planning unit 12 tries to minimize the total traveling time, when developing a delivery route using OR-based techniques. Instead of doing this, the delivery planning unit 12 may consider the time when the subject carrier returns to the distribution center, driving time, fuel consumption, or any (weighted) combination of those.

In summary, the optimization problem solver according to the present invention creates a population of individuals each of which indicates the strategy for solution searching, and it optimizes the strategies by using a genetic algorithm. It searches for the solutions using fast OR-based techniques, according to the strategies being optimized. The result of this OR-based solution search is evaluated according to a predefined fitness function, thus creating a new generation of individuals having higher fitness. Such combined use of a genetic algorithm and OR-based search techniques enables both a high-speed search of specific candidate solutions and a global search that encompasses the entire solution space.

Likewise, the delivery planning system according to the present invention creates a population of individuals each of which indicates the strategy of solution searching, optimizes the strategies using a genetic algorithm, and constructs some delivery plans based on the strategies being optimized. The system quickly generates specific delivery plans with OR-based methods, as well as using a genetic algorithm to perform a global search in the entire solution space.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A problem solver apparatus for solving an optimization problem whose possible solutions contain a plurality of stationary elements and non-stationary elements, said apparatus comprising:

搜 searching strategy optimization means for creating a population of individuals each of which has a chromosome specifying a solution searching strategy, and optimizing the solution searching strategies by using a genetic algorithm, wherein each of the solution searching strategies describes a selection order of the non-stationary elements, a starting element from which the stationary elements are scanned, and a scanning direction of the stationary elements;

solution searching means for finding candidate solutions in accordance with the solution searching strategies specified by the chromosomes of the individuals; and solution output means for outputting the candidate solutions that meet a predetermined criterion.

2. A problem solver apparatus according to claim 1, wherein the chromosome includes sections respectively indicating the selection order of the non-stationary elements, the starting element of the stationary elements, and the scanning direction of the stationary elements.

3. A problem solver apparatus according to claim 1, wherein said searching strategy optimization means calculates fitness values of the candidate solutions found by said solution searching means and evaluates the individuals based on the fitness values calculated.

4. A problem solver apparatus according to claim 1, wherein a solution of the optimization problem is represented as an array of elements, said solution searching means constructs the candidate solution by incrementally adding a new element to the array of elements, and each time said solution searching means adds the new element to the array of elements, said solution searching means tries to find the array of elements that will exhibit better fitness to a predetermined objective condition under given constraints.

5. A delivery planning system for solving a delivery planning problem, where a plurality of carriers deliver packages from a distribution center to different destinations under given constraints, said system comprising:

searching strategy optimization means for creating a population of individuals each of which has a chromosome specifying a solution searching strategy, and optimizing the solution searching strategies by using a genetic algorithm, wherein each of the solution searching strategies describes a selection order of the carriers, an initial destination from which the destinations are scanned, and a scanning direction of the destinations;

solution searching means for finding proposed delivery plans in accordance with the solution searching strategies specified by the chromosomes of the individuals; and solution output means for outputting the proposed delivery plans that meet a predetermined criterion.

6. A delivery planning system according to claim 5, wherein said searching strategy optimization means optimizes the solution searching strategies so as to achieve reduction of delivery costs and/or better compliance to the given constraints.

7. A delivery planning system according to claim 5, wherein:

the selection order designates in what order a subject carrier is selected from among the carriers;

the initial destination determines to which destination the subject carrier should be allocated first; and the scanning direction designates a direction for successively selecting a target destination in order to examine feasibility of allocating the subject carrier to the target destination.

8. A delivery planning system according to claim 7, wherein the chromosome includes sections respectively indicating the selection order, the initial destinations, and the scanning direction.

9. A delivery planning system according to claim 5, wherein said searching strategy optimization means has a predefined fitness function to calculate fitness values of the proposed delivery plans found by said solution searching means and evaluating the individuals based on the fitness values calculated with the predefined fitness function.

10. A delivery planning system according to claim 5, wherein said solution searching means finds the proposed delivery plans using an Operations Research-based method.

11. A delivery planning system according to claim 5, wherein said solution searching means recognizes locations of the distribution center and the destinations in a polar coordinate system.

12. A delivery planning system according to claim 11, wherein said solution searching means recognizes the location of the distribution center as the origin of the polar coordinate system.

13. A delivery planning system according to claim 11, wherein said solution searching means recognizes one position out of the barycenter of the destinations, the barycenter of the destinations and the distribution center, the median of the destinations, and the median of the destinations and the distribution center, as the origin of the polar coordinate system.

14. A delivery planning system according to claim 5, wherein said solution searching means recognizes locations of the distribution center and the destinations in a Cartesian coordinate system.

15. A delivery planning system according to claim 14, wherein said solution searching means recognizes the location of the distribution center as the origin of the Cartesian coordinate system.

16. A delivery planning system according to claim 14, wherein said solution searching means recognizes one position out of the barycenter of the destinations, the barycenter of the destinations and the distribution center, the median of the destinations, and the median of the destinations and the distribution center, as the origin of the Cartesian coordinate system.

17. A delivery planning system according to claim 5, wherein said solution searching means selects a target destination from among the destinations and a subject carrier from among the plurality of carriers in accordance with the solution searching strategies, and assigns the target destination to the subject carrier as long as the given constraints are satisfied.

18. A delivery planning system according to claim 17, wherein said solution searching means selects the target destination from among the destinations excluding the destinations that have already been assigned to the carriers other than the subject carrier.

19. A delivery planning system according to claim 5, wherein said solution searching means takes the given constraints into consideration when finding the proposed delivery plans, and the given constraints include at least one of limitations of working hours of the distribution center, limitations of office hours of delivery acceptance desks at the destinations, limitations of access to the destinations, limitations of types of carriers that are allowed to enter to the destinations, limitations of load capacity of the carriers, availability of temperature control facility in the carriers, limitations of operating hours of the carriers, limitations of total mileage of the carriers, and limitations of the number of carriers available in the distribution center.

20. A delivery planning system according to claim 19, wherein the limitations of load capacity of the carriers, which are taken into consideration as part of the given constraints by said solution searching means, include at least one of maximum load weight of each carrier, maximum load volume of each carrier, and maximum load dimension of each carrier.

21. A delivery planning system according to claim 5, wherein said solution searching means selects a target destination from among the destinations and a subject carrier from among the plurality of carriers in accordance with the solution searching strategies, and assigns the target destination to the subject carrier in consideration of a time period during which the subject carrier stays at the target destination.

22. A delivery planning system according to claim 5, wherein said solution searching means selects a target destination from among the destinations and a subject carrier from among the carriers in accordance with the solution searching strategies, and constructs a delivery route by assigning the target destination to the subject carrier if the given constraints are satisfied, and said solution searching means, when assigning the target destination to the subject carrier, determines delivery order in such a way that a predefined evaluation function for evaluating the delivery route will indicate an optimal condition.

23. A delivery planning system according to claim 22, wherein said solution searching means, when assigning the target destination to the subject carrier, examines all connection paths interconnecting the destinations and the distribution center which are involved in the delivery route under construction, and said solution searching means determines the delivery order by choosing one of the plurality of connection paths as an appropriate place at which the target destination is inserted, so that the predefined evaluation function will indicate an optimal condition.

24. A delivery planning system according to claim 23, wherein said solution searching means, after constructing the delivery route, rearranges the delivery order within the delivery route in such a way that the predefined evaluation function will exhibit an optimal condition.

25. A delivery planning system according to claim 24, wherein the delivery route contains a plurality of connection paths including a connection path from the distribution center to an initial destination where the subject carrier is scheduled to visit first, connection paths between consecutive destinations where the subject carrier is scheduled to visit sequentially, and a connection path to the distribution center from a final destination where the subject carrier is scheduled to visit last, said solution searching means, when rearranging the delivery route, examines all the plurality of connection paths to find alternative delivery routes that satisfy the given constraints, and only when the alternative delivery routes are found, chooses one of the alternative delivery routes that exhibits a best value of the predefined evaluation function.

26. A delivery planning system according to claim 5, wherein the predetermined evaluation function for evaluating the delivery route includes at least one of total traveling time, total driving hours, total driving distance, and total fuel cost.

* * * * *